US012580775B2

(12) United States Patent (10) Patent No.: US 12,580,775 B2
Escobar Ariza et al. (45) Date of Patent: Mar. 17, 2026

(54) CONNECTION AUTHORIZATION FROM A COMMUNICATION DEVICE TO AN APPLICATION

(71) Applicant: Schneider Electric Industries SAS, Rueil Malmaison (FR)

(72) Inventors: Ramses Alexander Escobar Ariza, Villeneuve-Loubet (FR); Matthieu Adam, Juan-les-Pins (FR)

(73) Assignee: Schneider Electric Industries SAS, Rueil Malmaison (FR)

( * ) Notice: Subject to any disclaimer, the term of this patent is extended or adjusted under 35 U.S.C. 154(b) by 206 days.

(21) Appl. No.: 18/210,694

(22) Filed: Jun. 16, 2023

(65) Prior Publication Data

US 2023/0421390 A1 Dec. 28, 2023

(30) Foreign Application Priority Data

Jun. 23, 2022 (EP) ..................................... 22305910

(51) Int. Cl.
*H04L 9/32* (2006.01)
*H04L 9/08* (2006.01)
(52) U.S. Cl.
CPC .......... *H04L 9/3263* (2013.01); *H04L 9/0877* (2013.01); *H04L 9/3247* (2013.01)
(58) Field of Classification Search
CPC ... H04L 9/3263; H04L 9/0877; H04L 9/3247; H04L 63/10
USPC ....................................................... 713/156
See application file for complete search history.

(56) References Cited

U.S. PATENT DOCUMENTS 11,552,803 B1 * 1/2023 Simkhada ............... G06F 21/73
11,601,288 B1 * 3/2023 Bacon ................... H04L 63/205

FOREIGN PATENT DOCUMENTS

WO 2014127373 A1 8/2014
WO 2020154159 A1 7/2020
WO WO-2022116734 A1 * 6/2022 ........... H04L 9/3249

OTHER PUBLICATIONS

Maksuti, Silia et al., "Automated and Secure Onboarding for System of Systems", IEEE Access, vol. 9, Aug. 3, 2021, pp. 111095-111113.
European Search Report and Search Opinion dated Dec. 8, 2022 for corresponding European Patent Application No. EP22305910.6, 9 pages.

* cited by examiner

*Primary Examiner* — Bryan F Wright
(74) *Attorney, Agent, or Firm* — Kinney & Lange, P.A.

(57) ABSTRACT

Connection authorization from a communication device (CD) to an application server (AS) uses an electronic device (ED) to provide a first dataset to a security server (SS) in response to a first request, the first dataset related to a certificate of the ED. The ED retrieves an intermediary certificate generated by the SS based on the first dataset and signed by the SS. When the ED is connected to a CD intended to be introduced in a secured network, the ED receives a second request from the CD including a second dataset related to a certificate of the CD. The ED then generates a third dataset related to a signature of certificate of the CD and to the intermediary certificate. The ED thereafter sends the third dataset to the CD to obtain authorization to access to the secure network from the AS by using the third dataset.

13 Claims, 2 Drawing Sheets

S1 | SS; AD → Req1(Ced) → ED

S2 | ED : DS1 ↔ Ced
ED → DS1 → AD; SS

S3 | SS : CI(DS1)

S4 | SS; AD → CI → ED

S5 | ED ↔ CD
CD → Req2(DS2, Ccd) → ED

S6 | ED : DS3(Ccd, CI)

S7 | ED → DS3 → CD

S8 | CD → DS3 → AS
CD ↔ AS

CONNECTION AUTHORIZATION FROM A COMMUNICATION DEVICE TO AN APPLICATION

FIELD OF INVENTION

The present disclosure relates generally to communication device enrolment, and more particularly to enrolment of devices newly added to a secure network.

BACKGROUND

A communication device is able to access a secure network with a certificate. Each device certificate should be signed by a certificate authority (CA), that is located or not in the network of the communication device.

Enrolling a communication device, for first installation or for replacement, requires the involvement of the security administrator that needs to create a Certificate Sign Request (CSR) for the communication device and send it to the certificate authority via connected or offline channel. The security administrator can then validate the Certificate Sign Request in the certificate authority. The communication device receives the signed certificate via online or offline channel.

To ensure device replacement in a timely manner, it is necessary to have a stock of devices already enrolled for the case where the security administrator is not available during the replacement.

There is therefore a need for improving device replacement and device enrolment, without involving any security administrator.

SUMMARY

This summary is provided to introduce concepts related to the present inventive subject matter. This summary is not intended to identify essential features of the claimed subject matter nor is it intended for use in determining or limiting the scope of the claimed subject matter.

In one implementation, there is provided a method for connection authorization from a communication device to an application server, comprising in an electronic device:

providing a first dataset to a security server in response to a first request, wherein the first dataset is related to a certificate of the electronic device, retrieving an intermediary certificate from the security server, wherein the intermediary certificate is generated by the security server based on the first dataset and signed by the security server, when connecting the electronic device to a communication device intended to be introduced in a secured network for the first time, receiving a second request from the communication device, the second request comprising a second dataset related to a certificate of the communication device, generating a third dataset related to a signature of certificate of the communication device by the electronic device and to the intermediary certificate, sending the third dataset to the communication device that is able to obtain authorization to access to the secure network from the application server by using the third dataset.

Advantageously, enrollment of a new communication device is possible without security administrator involvement during the replacement process and the security administrator authorization is delegated to an electronic device as a physical removable asset that is configured in advance by the security administrator in order to contain an intermediate authorization.

In case of a communication device replacement, it is thus possible to perform the device certificate signature using a removable asset instead of using the Certificate Authority directly. The removable asset is connected to the new communication device and is used to automatically generate a signed certificate to the communication device.

In an embodiment, the first dataset contains the certificate of the electronic device.

In an embodiment, the second dataset contains the certificate of the communication device.

In an embodiment, the first request inquires information about the certificate of the electronic device.

In an embodiment, the electronic device communicates with the security server (SS) through an access device.

In an embodiment, third dataset contains the certificate of the communication device signed by the electronic device.

In an embodiment, the signature of certificate of the communication device corresponds to a signature of a hash of the certificate of the communication device by the electronic device.

In an embodiment, the secure network relies on a public key infrastructure.

In an embodiment, the third dataset allows the application server to verify the intermediate certificate using a root certificate and to further verify the signature of the certificate of the communication device using the intermediate certificate.

In an embodiment, the electronic device interacts with a hardware security module to compute and store a secret related to a certificate.

In an embodiment, the application server is another communication device.

In another implementation, there is provided an electronic device for connection authorization from a communication device to an application server, comprising:

one or more interfaces to communicate with at least a communication device;

a processor coupled to the interfaces and configured to execute one or more processes; and a memory configured to store a process executable by the processor, the process when executed operable to:

provide a first dataset to a security server in response to a first request, wherein the first dataset is related to a certificate of the electronic device, retrieve an intermediary certificate from the security server, wherein the intermediary certificate is generated by the security server based on the first dataset and signed by the security server, when connecting the electronic device to the communication device intended to be introduced in a secured network for the first time, receive a second request from the communication device, the second request comprising a second dataset related to a certificate of the communication device, generate a third dataset related to a signature of certificate of the communication device by the electronic device and to the intermediary certificate, send the third dataset to the communication device that is able to obtain authorization to access to the secure network from the application server by using the third dataset.

In another implementation there is provided a computer-readable medium having embodied thereon a computer program for connection authorization from a communication device to an application server. Said computer program comprises instructions which carry out steps according to the method according to the invention.

BRIEF DESCRIPTION OF THE FIGURES

The detailed description is described with reference to the accompanying figures. In the figures, the left-most digit(s) of a reference number identifies the figure in which the reference number first appears. The same numbers are used throughout the figures to reference like features and components. Some embodiments of system and/or methods in accordance with embodiments of the present subject matter are now described, by way of example only, and with reference to the accompanying figures, in which.

The same reference number represents the same element or the same type of element on all drawings.

It should be appreciated by those skilled in the art that any block diagrams herein represent conceptual views of illustrative systems embodying the principles of the present subject matter. Similarly, it will be appreciated that any flow charts, flow diagrams, state transition diagrams, pseudo code, and the like represent various processes which may be substantially represented in computer readable medium and so executed by a computer or processor, whether or not such computer or processor is explicitly shown.

DESCRIPTION OF EMBODIMENTS

The figures and the following description illustrate specific exemplary embodiments of the invention. It will thus be appreciated that those skilled in the art will be able to devise various arrangements that, although not explicitly described or shown herein, embody the principles of the invention and are included within the scope of the invention. Furthermore, any examples described herein are intended to aid in understanding the principles of the invention, and are to be construed as being without limitation to such specifically recited examples and conditions. As a result, the invention is not limited to the specific embodiments or examples described below, but by the claims and their equivalents.

Figure 1:
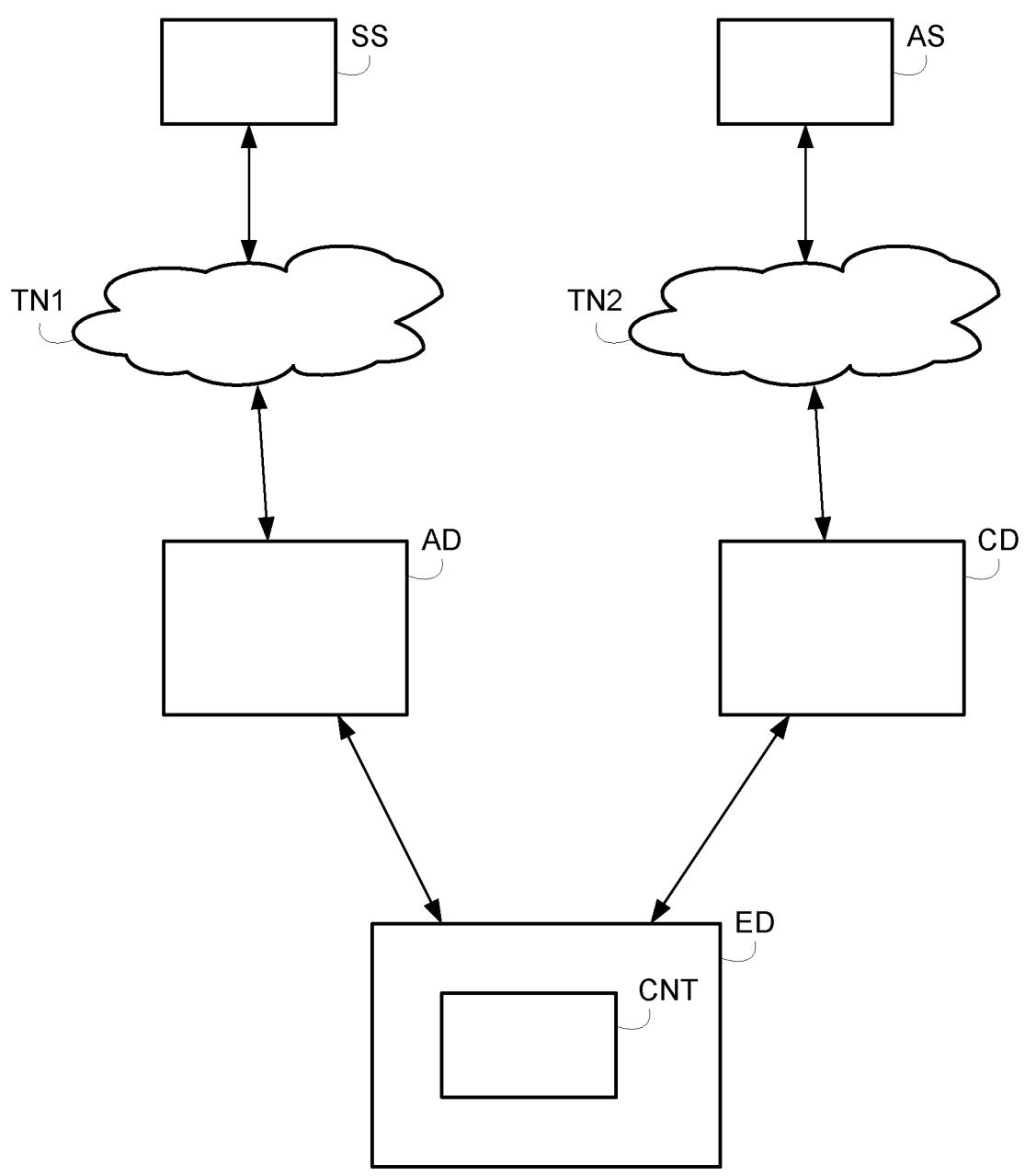
FIG. 1 shows a schematic block diagram of a communication system for an enrolment of a communication device according to one embodiment.

Referring to FIG. 1, a communication system comprises an access device AD, a security server SS, a communication device CD, an application server AS and an electronic device ED. The access device AD and the security server SS are able to communicate between them through a first telecommunication network TN1 and the communication device CD and the application server AS are able to communicate between them through a second telecommunication network TN2.

The first and second telecommunication networks may be a wired or wireless network, or a combination of wired and wireless networks. The first and second telecommunication networks can be associated with a packet network, for example, an IP ("Internet Protocol") high-speed network such as the Internet or an intranet, or even a company-specific private network.

The first or second telecommunication network is for example a digital cellular radio communication network of the GPRS (General Packet Radio Service), UMTS (Universal Mobile Telecommunications System), CDMA (Code Division Multiple Access) type, LTE (Long Term Evolution) or even 5G (Fifth Generation) type.

In another example, the first or second telecommunication network is a public wireless network of limited scope, such as WLAN (Wireless Local Area Network) or conforming to a standard 802.1x, or medium range according to the protocol WiMAX (World Wide Interoperability Microwave Access.

Additionally, the first or second telecommunication network may be operating in accordance with fourth or fifth generation wireless communication protocols and/or the like as well as similar wireless communication protocols that may be developed in the future.

The access device AD is able to communicate with the security server SS. The access device AD can be a mobile terminal, a personal computer or other client device such as a smartphone, a tablet or a Programmable Logic Controller. The access device AD is equipped with an application or a browser able to connect to the security server SS in order to get a certificate from this latter.

The communication device CD is able to communicate with the application server AS. The communication device CD can be a mobile terminal, a personal computer or other client device such as a smartphone, a tablet or a Programmable Logic Controller. The communication device CD is equipped with an application or a browser able to connect to the application server AS in order to be authenticated by this latter.

In one embodiment, the application server AS is a server authorizing devices like the communication device CD to connect to a given network. More especially, the application server is able to validate if a certificate provided by a device is signed by a certificate belonging to a trust list. In another embodiment, the application server AS is another communication device CD.

The security server SS is a server managing certificates. In one embodiment, the security server acts as a certificate authority that issues certificates. A certificate certifies the ownership of a public key by the named subject of the certificate. This allows other parties to rely upon signatures or on assertions made about the private key that corresponds to the certified public key. Thus the security server acts as a trusted third party, that is trusted both by the subject (owner) of the certificate and by the party relying upon the certificate.

In one embodiment, the electronic device ED is able to communicate directly with the security server SS, without needing the access device AD.

In one embodiment, the electronic device ED is able to compute and store a secret related to a certificate in a hardware security module which includes a secure storage. The electronic device ED may act as a mediator between a hardware security module and the communication device CD or the security server SS.

In one embodiment, the hardware security module is a trusted platform module (TPM), that may be a physically discrete TPM, a virtual TPM, an integrated TPM on a chip or a firmware TPM for example. The interface and physical properties of the TPM are specified by the Trusted Computing Group and are implementation independent. The electronic device ED is able to probe specific memory locations located in the hardware security module.

In one embodiment, the electronic device ED is one of a non-volatile memory card, USB key or any kind of thumb drive or hard drive.

In another embodiment, the electronic device ED is a mobile terminal, a personal computer or other client device such as a smartphone, a tablet.

The electronic device ED is capable of establishing a communication with the communication device CD through a wired or wireless connection. For example, the communication is a wired communication and can be established through a USB connection. For example, the communication is a short range communication that is contactless or wireless and can be related to NFC (Near Field Communication), Bluetooth or any UNB (Ultra Narrow Band) technology.

In one embodiment, the electronic device ED is a "smart-cover" fitted with an input mechanism (e.g. keypad), a LCD screen, Bluetooth capability and a simple processor to orchestrate the described process, when the communication device CD is a smartphone for example. It can be powered by a battery or rely on the communication device power supply (e.g. inductive-charging, micro-USB . . . ).

In another embodiment, the electronic device ED is a smartwatch or any wearable device fitted with an input mechanism (e.g. virtual keypad or voice recognition) and wireless capability. The wearable device is a communicating device that can be carried on a user. For example, the wearable device is a bracelet or amulet. The wearable device comprises a communication stack to communicate with a communication device sufficient to communicate small amount information such as certificates. For example, the communication stack supports NFC or Bluetooth LE.

The electronic device ED is considered as a removable asset as the electronic device ED is independent from the communication device CD and can be used with any communication device CD.

More especially, the electronic device ED becomes part of a trust chain between the security server SS and the application server AS. The certificate Ced of the electronic device ED is signed by the security server SS to be used as an intermediate certificate CI.

When the electronic device ED is connected to the communication device CD, the private key of the electronic device ED is used to sign the certificate Ccd of the communication device CD and the intermediate certificate CI trust chain is added to the certificate Ccd of the communication device CD.

When the communication device CD has to connect to a secured network, like Public Key Infrastructure (PKI) network, the communication device sends its signed certificate Ccd and the intermediate certificate CI related information to the application server AS. The application server AS can then verify the intermediate certificate using a Root certificate and verify the signed certificate Ccd of the communication device CD using the intermediate certificate.

An embodiment comprises an electronic device ED under the form of an apparatus comprising one or more processor(s), I/O interface(s), and a memory coupled to the processor(s). The processor(s) may be implemented as one or more microprocessors, microcomputers, microcontrollers, digital signal processors, central processing units, state machines, logic circuitries, and/or any devices that manipulate signals based on operational instructions. The processor(s) can be a single processing unit or a number of units, all of which could also include multiple computing units. Among other capabilities, the processor(s) are configured to fetch and execute computer-readable instructions stored in the memory.

The functions realized by the processor may be provided through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, explicit use of the term "processor" should not be construed to refer exclusively to hardware capable of executing software, and may implicitly include, without limitation, digital signal processor (DSP) hardware, network processor, application specific integrated circuit (ASIC), field programmable gate array (FPGA), read only memory (ROM) for storing software, random access memory (RAM), and non volatile storage. Other hardware, conventional and/or custom, may also be included.

The memory may include any computer-readable medium known in the art including, for example, volatile memory, such as static random access memory (SRAM) and dynamic random access memory (DRAM), and/or non-volatile memory, such as read only memory (ROM), erasable programmable ROM, flash memories, hard disks, optical disks, and magnetic tapes. The memory includes modules and data. The modules include routines, programs, objects, components, data structures, etc., which perform particular tasks or implement particular abstract data types. The data, amongst other things, serves as a repository for storing data processed, received, and generated by one or more of the modules.

A person skilled in the art will readily recognize that steps of the methods, presented above, can be performed by programmed computers. Herein, some embodiments are also intended to cover program storage devices, for example, digital data storage media, which are machine or computer readable and encode machine-executable or computer-executable programs of instructions, where said instructions perform some or all of the steps of the described method. The program storage devices may be, for example, digital memories, magnetic storage media, such as a magnetic disks and magnetic tapes, hard drives, or optically readable digital data storage media.

Figure 2:
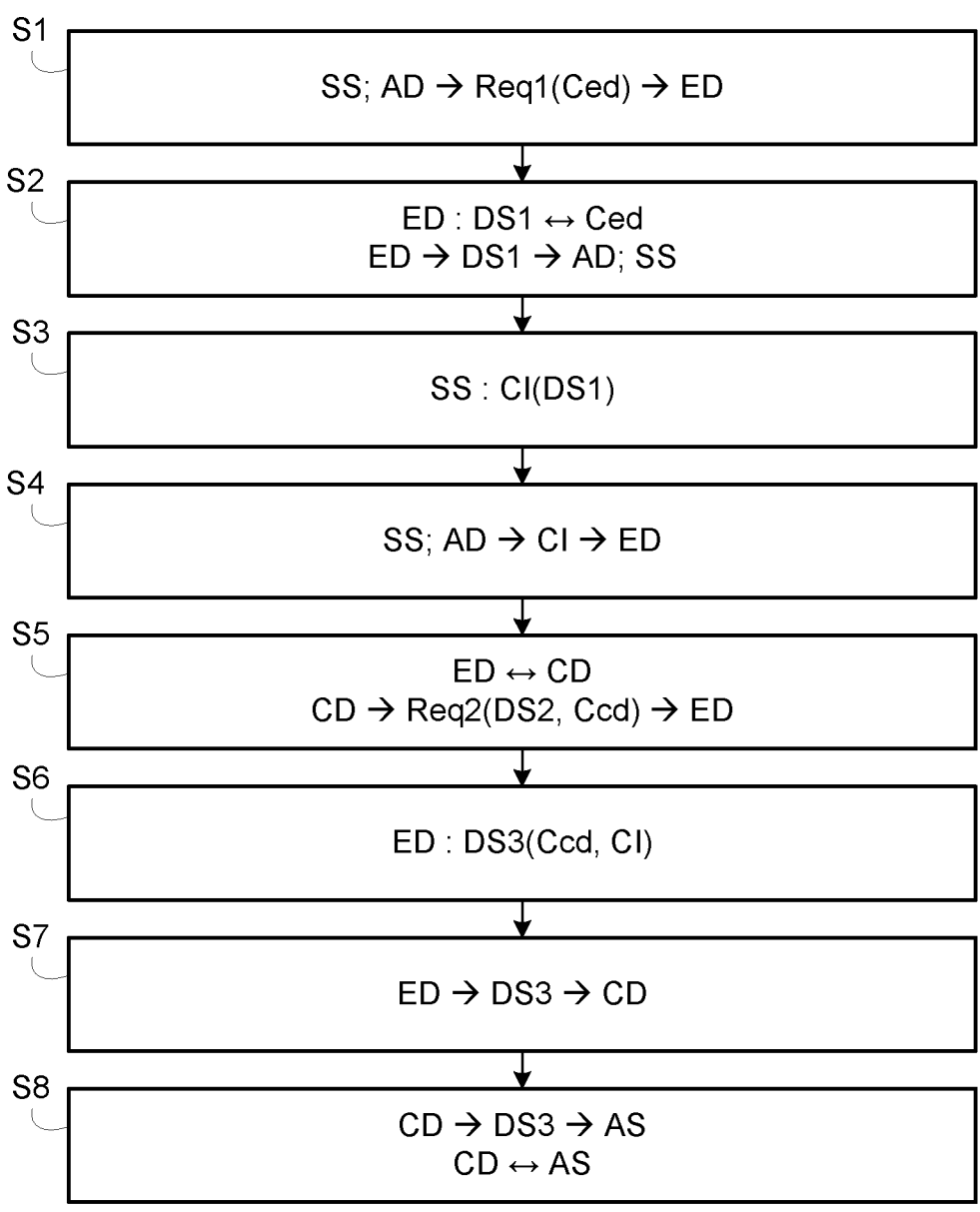
FIG. 2 is a flow diagram of a method for an enrolment of a communication device according to one embodiment.

With reference to FIG. 2, a method for an enrolment of a communication device according to one embodiment of the invention comprises steps S1 to S8.

In step S1, the electronic device ED receives a first request Req1 inquiring information about the certificate Ced of the electronic device ED. In one embodiment, the first request Req1 is received from the access device AD connected to the electronic device ED. In another embodiment, the request Req1 is received directly from the security server SS connected to the electronic device ED.

In one embodiment, the first request Req1 includes a request of type "get Certificate Signing Request".

In step S2, the electronic device ED generates a first dataset DS1 related to the certificate Ced of the electronic device ED. In one embodiment, the first dataset DS1 contains the certificate Ced of the electronic device ED. In one embodiment, the first dataset DS1 contains the public key of the electronic device ED and data allowing an entity to generate the certificate Ced of the electronic device ED. The electronic device ED sends the generated first dataset DS1 to the security server SS.

In one embodiment, the electronic device ED sends the generated first dataset DS1 to the security server SS through the access device AD. In another embodiment, the electronic device ED sends the generated first dataset DS1 directly to the security server SS.

In step S3, the security server SS generates an intermediary certificate CI based on the first dataset DS1. In one embodiment, the security server SS further adds the intermediary certificate CI to a trust list.

In one embodiment, the security server SS generates the intermediary certificate CI by signing the certificate Ced of the electronic device ED with a private key of the security server.

In step S4, the electronic device ED retrieves the intermediary certificate CI from the security server SS. In one embodiment, once the intermediary certificate is received by the access device AD, the access device uploads the intermediary certificate to the electronic device ED. In another embodiment, the security server SS sends the intermediary certificate directly to the electronic device ED.

In step S5, the electronic device ED is connected to a communication device CD. For example, the communication device replaces a previous device or is added to a secure network relying on a public key infrastructure.

The electronic device ED receives a second request Req2 from the communication device CD, the second request including a second dataset DS2 related to a certificate Ccd of the communication device CD. In one embodiment, the second request includes a request of type "Certificate Signing Request".

In step S6, the electronic device ED generates a third dataset DS3 related to a signature of certificate Ccd of the communication device CD by the electronic device ED and to the intermediary certificate CI.

In one embodiment, the third dataset DS3 contains the certificate Ccd of the communication device CD signed by the electronic device ED.

In one embodiment, the third dataset DS3 contains the signature of the certificate Ccd of the communication device CD by the electronic device. The signature of the certificate Ccd of the communication device CD corresponds to a signature of a hash of the certificate Ccd.

In one embodiment, the signature of the certificate Ccd of the communication device CD is performed with a private key of the electronic device ED.

In step S7, the electronic device ED sends the third dataset DS3 to the communication device CD.

In step S8, the communication device CD communicates with the application server AS to obtain authorization to connect to the secure network by using the third dataset DS3.

In one embodiment, the application server AS verifies the intermediate certificate CI from the third dataset DS3 using a root certificate from a trust list, shared with the security server SS. The application server AS further verifies the signature of the certificate Ccd of the communication device CD from the third dataset DS3 using the intermediate certificate CI.

Although the present invention has been described above with reference to specific embodiments, it is not intended to be limited to the specific form set forth herein. Rather, the invention is limited only by the accompanying claims and, other embodiments than the specific above are equally possible within the scope of these appended claims.

Furthermore, although exemplary embodiments have been described above in some exemplary combination of components and/or functions, it should be appreciated that, alternative embodiments may be provided by different combinations of members and/or functions without departing from the scope of the present disclosure. In addition, it is specifically contemplated that a particular feature described, either individually or as part of an embodiment, can be combined with other individually described features, or parts of other embodiments.

The invention claimed is:

1. A method for connection authorization from a communication device to an application server, comprising in an electronic device:
   providing a first dataset to a security server in response to a first request, wherein the first dataset is related to a certificate of the electronic device,
   retrieving an intermediary certificate from the security server, wherein the intermediary certificate is generated by the security server based on the first dataset and signed by the security server,
   when connecting the electronic device to a communication device intended to be introduced in a secured network for the first time, receiving by the electronic device a second request from the communication device, the second request comprising a second dataset related to a certificate of the communication device,
   generating a third dataset related to a signature of certificate of the communication device by the electronic device and to the intermediary certificate, and
   sending the third dataset to the communication device, wherein the communication device is able to obtain authorization to access to the secure network from the application server by sending the third dataset to the application server;
   wherein the electronic device is independent from the communication device and may be used with a plurality of communication devices.

2. The method according to claim 1, wherein the first dataset contains the certificate of the electronic device.

3. The method according to claim 1, wherein the second dataset contains the certificate of the communication device.

4. The method according to claim 1, wherein the first request inquires information about the certificate of the electronic device.

5. The method according to claim 1, wherein the electronic device communicates with the security server through an access device that is separate from the electronic device.

6. The method according to claim 1, wherein the third dataset contains the certificate of the communication device signed by the electronic device.

7. The method according to claim 1, wherein the signature of certificate of the communication device corresponds to a signature of a hash of the certificate of the communication device by the electronic device.

8. The method according to claim 1, wherein the secure network relies on a public key infrastructure.

9. The method according to claim 1, wherein the third dataset allows the application server to verify the intermediate certificate using a root certificate and to further verify the signature of the certificate of the communication device using the intermediate certificate.

10. The method according to claim 1, wherein the electronic device interacts with a hardware security module to compute and store a secret related to a certificate.

11. The method according to claim 1, wherein the application server is another communication device.

12. An electronic device for connection authorization from a communication device to an application server, comprising:
   one or more interfaces to communicate with at least a communication device;
   a processor coupled to the interfaces and configured to execute one or more processes; and a memory configured to store a process executable by the processor, the process when executed operable to:

provide a first dataset to a security server in response to a first request, wherein the first dataset is related to a certificate of the electronic device, retrieve an intermediary certificate from the security server, wherein the intermediary certificate is generated by the security server based on the first dataset and signed by the security server, when connecting the electronic device to the communication device intended to be introduced in a secured network for the first time, receive a second request from the communication device, the second request comprising a second dataset related to a certificate of the communication device, generate a third dataset related to a signature of certificate of the communication device by the electronic device and to the intermediary certificate, and send the third dataset to the communication device, wherein the communication device is able to obtain authorization to access the secure network from the application server by using the third dataset to the application server;

wherein the electronic device is independent from the communication device and may be used with a plurality of communication devices.

13. A non-transitory computer-readable medium having embodied thereon a computer program for executing the method according to claim 1.

\* \* \* \* \*